(12) United States Patent
Fuller et al.

(10) Patent No.: US 9,053,343 B1
(45) Date of Patent: Jun. 9, 2015

(54) TOKEN-BASED DEBUGGING OF ACCESS CONTROL POLICIES

(71) Applicant: Amazon Technologies, Inc., Reno, NV (US)

(72) Inventors: Erik James Fuller, Cape Town (ZA); David Everard Brown, Cape Town (ZA); James Alfred Gordon Greenfield, Cape Town (ZA); Peter Nicholas DeSantis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/677,212

(22) Filed: Nov. 14, 2012

(51) Int. Cl.
| | |
|---|---|
| *G06F 21/00* | (2013.01) |
| *H04L 29/06* | (2006.01) |
| *G06F 21/62* | (2013.01) |
| *H04W 12/04* | (2009.01) |
| *H04W 12/06* | (2009.01) |

(52) U.S. Cl.
CPC ........ *G06F 21/6227* (2013.01); *G06F 21/6263* (2013.01); *G06F 2221/0711* (2013.01); *G06F 2221/2101* (2013.01)

(58) Field of Classification Search
CPC ............ G06F 21/6227; G06F 21/6263; G06F 2221/2101; G06F 2221/0711
USPC .................................................. 726/1, 9, 11
See application file for complete search history.

(56) References Cited

U.S. PATENT DOCUMENTS

| | | | |
|---|---|---|---|
| 2008/0077971 A1* | 3/2008 | Wright et al. | 726/1 |
| 2009/0165111 A1* | 6/2009 | Zhang et al. | 726/9 |
| 2009/0193493 A1* | 7/2009 | Becker et al. | 726/1 |

FOREIGN PATENT DOCUMENTS

WO    WO 2010142170 A1 * 12/2010

OTHER PUBLICATIONS

Heath, M.W. ; Burleson, W.P. ; Harris, I.G. ; "Synchro-tokens: a deterministic GALS methodology for chip-level debug and test" ; Computers, IEEE Transactions on vol. 54 , Issue: 12 ; Publication Year: Dec. 2005 ; pp. 1532-1546.*

* cited by examiner

*Primary Examiner* — Kambiz Zand
*Assistant Examiner* — Courtney Fields
(74) *Attorney, Agent, or Firm* — Kilpatrick Townsend & Stockton LLP

(57) ABSTRACT

Methods and systems for allowing system administrators to effectively debug access control issues experience by users without comprising security. In some embodiment, when a user's request to access services provided by a service provider is denied, the user may be issued a token that encodes some of debugging information useful for determining the cause of the denial of access. The debugging information may be encoded such that it is inaccessible to the user. Subsequently, the user may give the token to an administrator. The administrator may submit the token to the service provider, which may decode the token and provide the administrator access to debugging information that is useful for debugging access control policies causing the denial of access.

26 Claims, 9 Drawing Sheets

TOKEN-BASED DEBUGGING OF ACCESS CONTROL POLICIES

BACKGROUND

Modern computing networks provide access to a wide variety of computing resources such as data management, data processing, communications and the like. With increasing number of computing resources and associated users, increasingly more complex access control policies may be defined and applied. Thus, when a user's request to access a computing resource is denied, it may be difficult for a system administrator to determine the cause of the denial of access. Although a user whose access is denied is usually presented with some error message such as "Access denied," such an error message is often kept general to avoid giving a malicious party clues of how to exploit a vulnerability. Hence, such an error message may not include sufficiently details to allow an administrator to effectively debug the access control policies.

BRIEF DESCRIPTION OF THE DRAWINGS

Various embodiments in accordance with the present disclosure will be described with reference to the drawings, in which.

DETAILED DESCRIPTION

Figure 1:
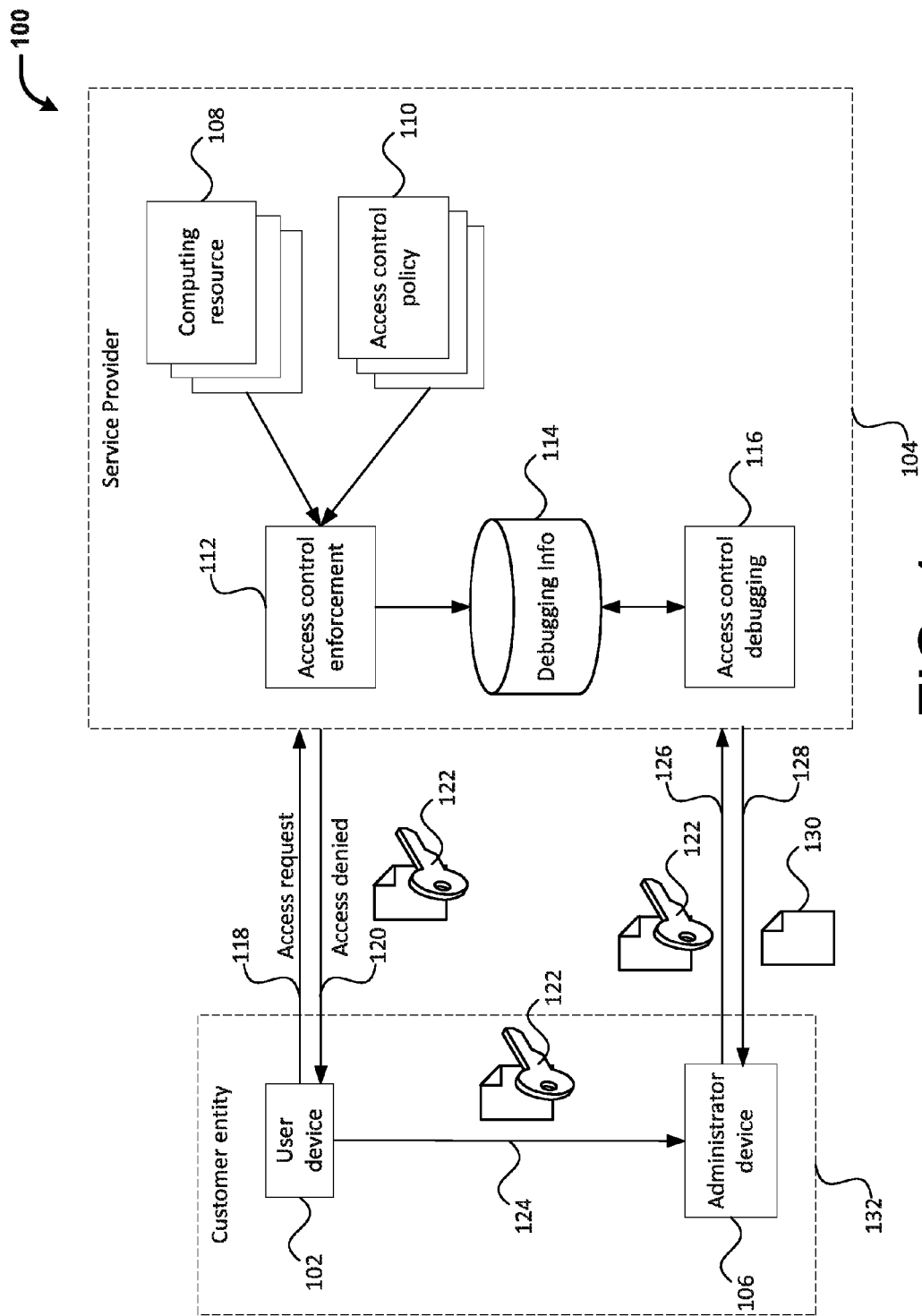
FIG. 1 illustrates an example implementation of debugging access control policies, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein allow customers to debug complex access control polices without compromising security. In various embodiments, a computing resource service provider (service provider) may provide its clients access to a variety of computing resources, for example, via web services. Such computing resources may include virtual computer systems, data storage or management, network connections and interfaces and the like. The service provider may provide and/or allow clients to define and configure an access control system that to limit or otherwise control access to the computing resources. Such an access control system may include access control policies that may address security, privacy, access, regulatory and cost concerns. Access control policies may be defined in layers or hierarchies and may be applicable at various levels of granularity such as users, groups of users, components of computing resources, computing resources, groups of computing resources and the like. For example, an access control list (ACL) may be defined for a data storage system to specify the users that may read and/or write to the system. Another ACL may be associated with a data object stored in the data storage system and may specify the users that may read, update and/or delete the data object. In various embodiments, access control policies may be defined based on, for example, user identities and/or credentials, their membership in various predefined groups, types of computing resources, operations to be performed and the like.

In some embodiments, a user may request access to one or more computing resources. Such a request may specify credential information that may be required for accessing the computing resource. Credential information may include login names, passwords, security keys, smart card, biometric information (such as fingerprints, retinas, palms, and/or voice) and the like. Such credential information may be provided by various sources such as the user, a system administrator, a service provider, a third party and the like. In some embodiments, the service provider may check the credential information, among other information, against one or more access control policies to determine whether to grant or deny a requested access.

In some embodiments, if the service provider determines that requested access to one or more computing resources is to be denied, the service provider may provide the user with a token that encodes at least some debugging information useful for determining (e.g., by a system administrator) a cause of the denied access. A token may be a data object, message, identifier or any embodiment of information that encodes at least some debugging information related to a requested access to one or more computing resources. While debugging information is illustratively used herein in reference to information useful for debugging access control policies applicable to a requested access to one or more computing resources, debugging information may also include any information useful for debugging any type of (typically user-experienced) error or any information generally related to the processing of a request (whether the request is granted or denied). For example, debugging information may include identity of a requesting user, computing resource and/or operation involved, network address of the source of the request, time of the request, credential information, computing resources and/or operations involved, access control policies applied or applicable to the requested access and other information. As another example, debugging information may include information useful for obtaining detailed information regarding the evaluation of one or more access control policies. In some embodiments, the token may include a cryptographic encoding of some or all of the debugging information discussed above, such as using a cryptographic key or function. In other embodiments, the token may include an identifier (such as a hash value) or a reference that may be used to look up more debugging information from the service provider or a third party. In various embodiments, some or all of the debugging information encoded in the token may be inaccessible to the user who receives the token from the service provider. For example, the debugging information may be encrypted with a cryptographic key that the user does not have access to. Or, the debugging information may include an identifier or reference which is meaningless to the user. This way, the user, who may not be authorized to access the debugging information, is prevented from such access while still being able to pass on this information to someone (e.g., a system administrator) who is authorized to access the debugging information, for example, for diagnostic purposes.

In some embodiments, a user who receives a token from a service provider as a response for a denied access may present the token to a system administrator or any entity that is authorized to access the debugging information. In some embodiments, the service provider may provide an application programming interface ("API") for an authorized user to query access control debugging information based at least in part on information included in the token. In some embodiments, the authorized user may or may not process the token (e.g., extraction and decoding of information) before providing token or a portion thereof to the service provider. For example, in an embodiment, the authorized user may be equipped with a cryptographic key that may be used to decrypt at least a portion of the token. In some embodiments, the communications between the authorized user and the service provider may be carried over a secure channel, such as using the secure shell (SSH) protocol, to prevent eavesdropping and/or tampering. In addition, the authorized user may be required to perform authentication and/or authorization steps to ensure security.

In some embodiments, the service provider may make available debugging information based at least in part on the token information provided by the authorized user, for example, via the API. For example, the token information may be used to look up more detailed debugging information (e.g., from a log file or a local or remote data store). For another example, the token information may decoded (e.g., cryptographically) and provided to the authorized user. In some embodiments, the service provider may provide an "audit trail" associated with the requested access for which the token was generated. Such an audit trail may include, for example, a list of computing resources for which access control is checked, access control policies applicable to the computing resources and the results of the access control checks. In some embodiments, various "push" and/or "pull" technologies may be applied to make any portion of the debugging information available to an authorized user. For example, the authorized user may be pull and the service provider may push some or all debugging information related to one or more tokens for multiple times within a period of time, for example, using batch processing.

In some embodiments, the authorized user may use the debugging information to debug one or more access control policies to determine the reason and/or a fix for the access failure. For example, a user may need to be added to an ACL associated with a computing resource or to a group of users who have access to the computing resource. In some embodiments, the debugging information may be provided as input to another program, process or service to perform further debugging. For example, in an embodiment, the debugging information may be provided as input to a simulator program that simulates the user's attempted access to the computing resources to determine the cause of the denied access. Using methods described herein, an authorized user such as a system administrator may obtain detailed information useful for analyzing and debugging a complex access control system in a way that is substantially transparent to the users of the system.

FIG. 1 illustrates an example implementation 100 of debugging access control policies, in accordance with at least one embodiment. In this example, a customer entity 132 (such as an individual, company or other organization) may utilize services provided by a service provider 104, for example, to access one or more computing resources 108 provided by the service provider 104. The customer entity 132 may include one or more users (not shown) operating one or more user devices 102 and one or more system administrators (not shown) operating one or more administrator devices 106. The user devices 102 or administrator devices 132 may include a mobile phone, a smart phone, a personal digital assistant (PDA), a laptop computer, a desktop computer, a thin-client device, a tablet PC or any other computing device capable of communicating with the service provider over a network. The network may include the Internet, a local area network ("LAN"), a wide area network ("WAN"), a cellular data network and/or other data network.

In some embodiments, user device 102 and administrator device 106 are operated by entities (e.g., users, accounts, identities, processes) with different credentials. For example, a user operating user device 102 may not have the credentials to access certain information where as another user operating administrator device 106 may have the credentials to access such information. As used herein, the terms "user" and "administrator" are used for illustrative purpose only to designate entities with different credentials and/or rights. In some instances, user device 102 and administrator device 132 may be the same device. In some embodiments, the same entity (e.g., a user or an automated process) could operate user device 102 using a user account and administrative device 108 using a system administrator account, for example, to test or verify a certain configuration of access control policies. In such embodiments, user device 102 and administrator device 132 may or may not be the same device.

In some embodiments, a user device 102 may send a request 118 to access to one or more computing resources 108 provided by a service provider 104, for example, via a Web service interface or other APIs. The computing resources 108 may include computer systems, data storage systems, network interfaces or connections and the like. The request 118 may include any request related to a service provided by the service provider 104, such as logging in to a service interface, provisioning or management of a virtual computer system or a virtual network, management of data stored in a data storage service and the like. The access to the computing resources 108 may be governed by one or more access control policies 110. In some embodiments, the service provider 104 may include an access control enforcement service 112 that determines whether to grant or deny the request 118 based at least in part on information related to the requested access and applicable access control policies. Information related to the requested access may include computing resource(s) and/or operation(s) being requested, time of the request, credential information of the user, source network address of the request, and the like. For example, in an embodiment, one or more computing resource and/or operations may belong to one or more security groups, each of which being associated with a set of access control policies. In such embodiments, different access control policies may apply depending on the security group(s) to which the requested computing resource(s) and/or requested operation(s) belong. In another embodiment, access control policies may be defined in terms of the source of a request. For example, such access control policies may include a network ACL that is used to restrict ingress and/or egress traffic coming into and out of one or more computing resources. In some embodiments, some or all of the access control policies may be provided by a service provider and/or an administrator of a customer entity. For example, a set of default access control policies (e.g., security groups, network ACL) may be provided by a service provider and a customer entity's system administrator may add, remove, edit or otherwise customize the default access control policies to suit the needs of the customer entity.

In some embodiments, the user's request 118 to access one or more computing resources may be denied based on applicable access control policies. For example, the user may not have the required access credentials, may not be permitted to access a specific computing resource and/or to perform a specific operation based on an ACL or the user may be blocked based on the source IP address of the request. In some embodiments, a user's request 118 may entail access to multiple computing resources and access may be denied for at least one of those computing resources. In any case, the service provider 104 may provide the user with a response 120 that indicates such a denial of access. Typically, such a response 120 may include a message to be displayed to the user on the user device 102. The message may include general information that indicates to the user that access is denied, but may not include detailed context information to enable determination (e.g., by a system administrator) of the exact reason (s) for the denial of access. Such context information may include, for example, the computing resource and/or operation for which access is denied and applicable or applied access control policies or identifiers thereof. Such more detailed information may be encoded in a token 122 that may be sent with or separately from the response 120. As described above, a token may include a data object, message, identifier or any embodiment of information that would allow an administrator to analyze and/or debug an access control failure or any other user-experienced errors.

In some embodiments, the token 122 may encode detailed information related to the requested access such as a service endpoint, network address (e.g., IP address, port number) of the request, time of the request, session information, identity of the user, credential information. In addition, the token 122 may include computing resources and/or operations involved, access control policies applied or applicable or checks performed for the computing resources and/or operations and the results thereof, as well as other relevant context information. In some embodiments, some or all of the debugging information discussed above may be encoded in the token and/or stored by the service provider or a third party entity, for example, in a log file and/or a data store 114. In some embodiments, the token is used to store all of the debugging information and none of the debugging information is stored outside the token. The debugging information encoded in the token 122 may include any of the request or access-related information described above and/or one or more identifiers that identify any of the above-described information.

In some embodiments, the content and/or format of the debugging information may be configurable by the service provider and/or a customer entity. For example, a system administrator of a customer entity may be allowed to configure, via a user interface provided by the service provider, the level of detail for debugging information associated with various computing resource(s), access control policies and the like. In other embodiments, the format and content of the debugging information may be determined at least in part by the service provider. In some embodiments, such configuration may be based at least in part on customer profile, service-level agreement, pricing and other factors.

In some embodiments, debugging information described above may be encoded and included in the token 122 in a format that renders the encoded information at least partially inaccessible or transparent to the user receiving the token 122. For example, the debugging information may be encrypted using a cryptographic key that is not intended to be available to the user device 102 or an entity operating the user device 102. For another example, the token 122 may include an identifier, reference or an encoding thereof (e.g., a hash value) that is likely to be meaningless to the user receiving such a token.

In some embodiments, the token 122 may be transferred 124 to an administrator device 106 that may be operated by a system administrator. In some embodiments, the token 122 may be transferred to the administrator device 106 using a printout, a note, a log file, a data storage medium (e.g., CD, USB drive), an email, a text message, a facsimile transmission, a telephone call, through an API (such as using a web user interface) or any suitable communication means, channels or protocols. In some embodiments, an automated process running on the user device or elsewhere may "push" the token or cause the token to be pushed to the administrator device 106. In other embodiments, a process running on the administrator device 106 or elsewhere may "pull" the token or cause the token to be pulled to the administrator device 106. In various embodiments, such push or pull of the tokens may be implemented on a periodic basis (e.g., weekly), at the triggering of one or more predefined events (e.g., if the number or size of the tokens exceeds a threshold value).

In some embodiments, additional information may be provided by the user device to the administrator device besides the token. Such information may also be considered part of the debugging information. For example, the user device may provide information regarding the identity of the user, request information (e.g., source IP address, time of request), user credential information and the like. In some embodiments, the user device and the administrator device may communicate over a secure channel.

In some embodiments, the administrator device 106 may be configured with information necessary to decode at least some information that is encoded in the token 122. In an embodiment, the token or a portion thereof may be encrypted with a public key associated with an administrative account. In such an embodiment, the administrative account (e.g., operating the administrative device 106) may have access to the corresponding private key to decrypt the token or a portion thereof. In some embodiments, the administrator device 106 may request 126 access to debugging information by sending the token 122 and/or information derived therefrom to the service provider in addition to or instead of decoding the token 122 or a portion thereof. In some embodiments, service provider may provide a service, such as access control debugging service 116, or other user interface or API, to handle such requests. In various embodiments, the access control debugging service 116 and access control enforcement service 112 may be implemented by the same or different computer system(s).

In some embodiments, the access control debugging service 116 may decode the token 122 (e.g., cryptographically or non-cryptographically) and/or retrieved more debugging information based on the information included in the token, for example, from a local or remote data store 114. For example, the token 122 may encode a time and/or a source IP address of a user request, both or either of which may be used to look up information related to the request, computing resource(s) and/or operation(s) requested, access checks performed and the like. The debugging information, extracted from the token or from elsewhere, may then be provided 128 to the administrator device 106, for example, over a secure channel.

In some embodiments, the service provider may provide an "audit trail" of information related to the processing of a user's request. For example, the audit trail may include a list of computing resources and/or operations involved in the fulfillment of a user request, access control checks performed and results thereof. The audit trail may be presented in graphical, textual, or any other suitable format. For example, the audit trail may be presented in a web page as a series of steps involved in the processing of a user's request, where each step may include a control or link to access further information.

In general, the debugging information that is derived based on the token 122 and/or provided by the user device is intended to help an administrator to determine the exact cause for a failed user request. For example, in an embodiment, the administrator may feed some or all of the debugging information into a simulator program that simulates the failed access request. For another example, the administrator may pass on some of the debugging information to a service or service provider for analysis. Based on the result of the analysis, appropriate actions may be initiated. For example, access control policies may be changed to allow a user access to a particular computing resource (e.g., by adding the user to an ACL associated with the computing resource, changing security group settings of the computing resource, or generating new or updated access credentials for the user). In other cases, the administrator may determine that no action is required, for example, when the administrator determines that the access control policies are configured correctly.

Methods described herein also allows a user (such as an administrator) may use a first account or identity (and credentials thereof) to request access to one or more computing resources and uses a second account or identity (and credentials thereof) to access information related to the request associated with the first account or identity, where the first account or identity may not have authority to access such information.

Figure 2:
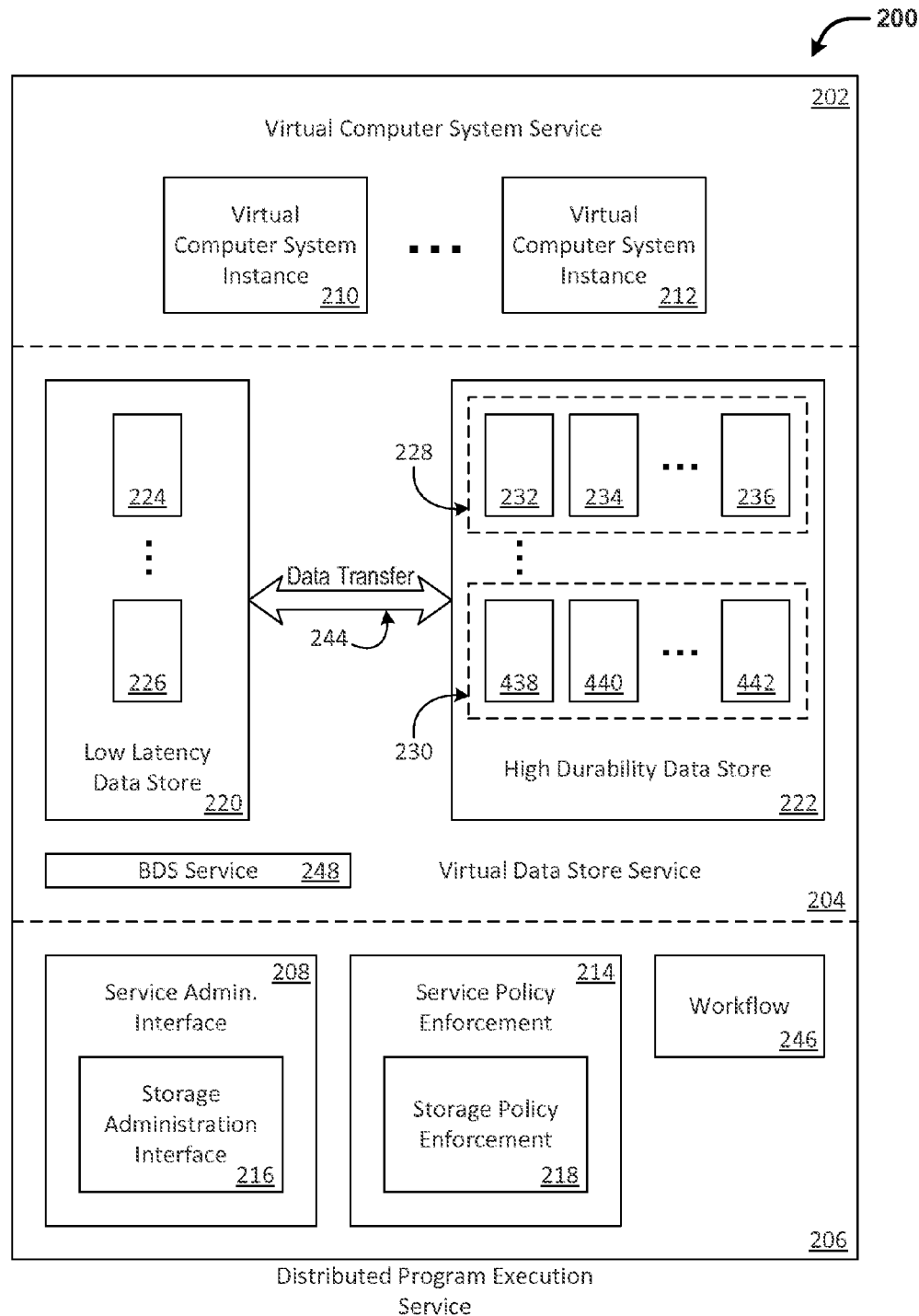
FIG. 2 illustrates aspects of an example distributed program execution service where methods described herein may be implemented, in accordance with at least one embodiment.

In at least one embodiment, one or more aspects of the environment 100 may incorporate and/or be incorporated into a distributed program execution service. FIG. 2 illustrates aspects of an example distributed program execution service 200 where methods described herein may be implemented, in accordance with at least one embodiment. The distributed program execution service 200 provides virtualized computing services, including a virtual computer system service 202 and a virtual data store service 204, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers such as web server and application server, one or more data stores, as well as communication bandwidth in the interlinking network. The computing resources managed by the distributed program execution service 200 are not shown explicitly in FIG. 2 because it is an aspect of the distributed program execution service 200 to emphasize an independence of the virtualized computing services from the computing resources that implement them.

The distributed program execution service 200 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the virtualized computing services. The service control plane 206 may include a service administration interface 208. The service administration interface 208 may include a Web-based user interface configured at least to enable users and/or administrators of the virtualized computing services to provision, de-provision, configure and/or reconfigure (collectively, "provision") suitable aspects of the virtualized computing services. For example, a user of the virtual computer system service 202 may provision one or more virtual computer system instances 210, 212. The user may then configure the provisioned virtual computer system instances 210, 212 to execute the user's application programs. The ellipsis between the virtual computer system instances 210 and 212 indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or Web-based service interfaces. In at least one embodiment, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement. A workflow, may not be the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 208. As another example, a policy enforcement workflow may be created from a policy enforcement workflow template configured with parameters by the service policy enforcement component 214.

The workflow component 246 may modify, further specify and/or further configure established workflows. For example, the workflow component 246 may select particular computing resources of the distributed program execution service 200 to execute and/or be assigned to particular tasks. Such selection may be based at least in part on the computing resource needs of the particular task as assessed by the workflow component 246. As another example, the workflow component 246 may add additional and/or duplicate tasks to an established workflow and/or reconfigure information flow between tasks in the established workflow. Such modification of established workflows may be based at least in part on an execution efficiency analysis by the workflow component 246. For example, some tasks may be efficiently performed in parallel, while other tasks depend on the successful completion of previous tasks.

The virtual data store service 204 may include multiple types of virtual data store such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. For each data set 224, 226 maintained by the low latency data store 220, the high durability data store 222 may maintain a set of captures 228, 230. Each set of captures 228, 230 may maintain any suitable number of captures 232, 234, 236 and 238, 240, 242 of its associated data set 224, 226, respectively, as indicated by the ellipses. Each capture 232, 234, 236 and 238, 240, 242 may provide a representation of the respective data set 224 and 226 at particular moment in time. Such captures 232, 234, 236 and 238, 240, 242 may be utilized for later inspection including restoration of the respective data set 224 and 226 to its state at the captured moment in time. Although each component of the distributed program execution service 200 may communicate utilizing the underlying network, data transfer 244 between the low latency data store 220 and the high durability data store 222 is highlighted in FIG. 2 because the contribution to utilization load on the underlying network by such data transfer 244 can be significant.

For example, the data sets 224, 226 of the low latency data store 220 may be virtual disk files (i.e., file(s) that can contain sequences of bytes that represents disk partitions and file systems) or other logical volumes. The low latency data store 220 may include a low overhead virtualization layer providing access to underlying data storage hardware. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjoint. In a specific embodiment, the low latency data store 220 could be a Storage Area Network target or the like. In this exemplary embodiment, the physical computer system that hosts the virtual computer system instance 210, 212 can send read/write requests to the SAN target.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual storage volumes.

Data stores in the virtual data store service 204, including the low latency data store 220 and/or the high durability data store 222, may be facilitated by and/or implemented with a block data storage (BDS) service 248, at least in part. The BDS service 248 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 248 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 248. The high durability data store 222 may work with sets of data that are large relative to the data blocks manipulated by the BDS service 248. The high durability data store 222 may be implemented independent of the BDS service 248. For example, with distinct interfaces, protocols and/or storage formats.

Each data set 224, 226 may have a distinct pattern of change over time. For example, the data set 224 may have a higher rate of change than the data set 226. However, in at least one embodiment, bulk average rates of change insufficiently characterize data set change. For example, the rate of change of the data set 224, 226 may itself have a pattern that varies with respect to time of day, day of week, seasonally including expected bursts correlated with holidays and/or special events, and annually. Different portions of the data set 224, 266 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 232 of the data set 224 may involve a substantially full copy of the data set 224 and transfer 244 through the network to the high durability data store 222 (may be a "full capture"). In a specific example, this may include taking a snapshot of the blocks that make up a virtual storage volume. Data transferred between the low latency data store 220 and high durability data store 222 may be orchestrated by one or more processes of the BDS service 248. As another example, a virtual disk (storage volume) may be transferred to a physical computer hosting a virtual computer system instance 210. A hypervisor may generate a write log that describes the data and location where the virtual computer system instance 210 writes the data. The write log may then be stored by the high durability data store 222 along with an image of the virtual disk when it was sent to the physical computer.

The data set 224 may be associated with various kinds of metadata. Some, none or all of such metadata may be included in a capture 232, 234, 236 of the data set 224 depending on the type of the data set 224. For example, the low latency data store 220 may specify metadata to be included in a capture depending on its cost of reconstruction in a failure recovery scenario. Captures 234, 236 beyond the initial capture 232 may be "incremental", for example, involving a copy of changes to the data set 224 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 232, 234, 236 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 234, 236, utilization load on the underlying computing resources can be significantly less for incremental captures compared to full captures.

For example, a capture 232, 234, 236 of the data set 224 may include read access of a set of servers and/or storage devices implementing the low latency data store 220, as well as write access to update metadata, for example, to update a data structure tracking "dirty" data blocks of the data set 224. For the purposes of this description, data blocks of the data set 224 are dirty (with respect to a particular class and/or type of capture) if they have been changed since the most recent capture (of the same class and/or type). Prior to being transferred 244 from the low latency data store 220 to the high durability data store 222, capture 232, 234, 236 data may be compressed and/or encrypted by the set of servers. At the high durability data store 222, received capture 232, 234, 236 data may again be written to an underlying set of servers and/or storage devices. Thus each capture 232, 234, 236 involves a load on finite underlying computing resources including server load and network load. It should be noted that, while illustrative embodiments of the present disclosure discuss storage of captures in the high durability data store 222, captures may be stored in numerous ways. Captures may be stored in any data store capable of storing captures including, but not limited to, low-latency data stores and the same data stores that store the data being captured.

Captures 232, 234, 236 of the data set 224 may be manually requested, for example, utilizing the storage administration interface 216. In at least one embodiment, the captures 232, 234, 236 may be automatically scheduled in accordance with a data set capture policy. Data set capture policies in accordance with at least one embodiment may be specified with the storage administration interface 216, as well as associated with one or more particular data sets 224, 226. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Figure 3:
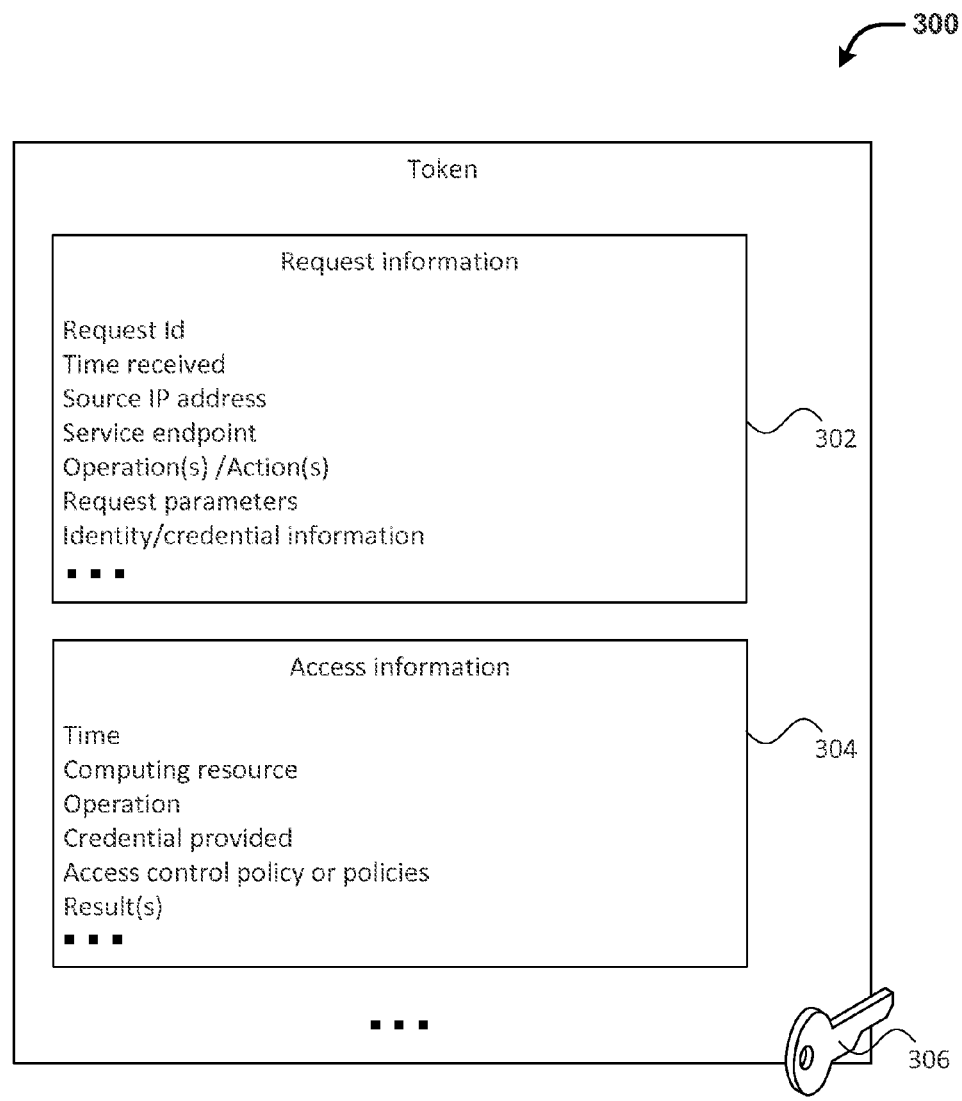
FIG. 3 illustrates an example representation of a token for debugging access control policies, in accordance with at least one embodiment.

FIG. 3 illustrates an example representation of a token 300 for debugging access control policies, in accordance with at least one embodiment. Such a token may be provided, for example, by a service provider in response to a user's failed attempt to access one or more computing resources. In the illustrative example, the token 300 may encode, among other information, request information 302 and access information 304 related to a user request to access one or more computing resources. In other embodiments, a token may include more or less information than illustrated here. In some embodiments, request information 302 may include a request Id that uniquely identifies the request received by the service provider, a timestamp of when the request is received by the service provider, the source IP address of the request, service endpoint specified by the request, operation(s) or action(s) specified in the request, request parameters, identity and/or credential information related to the requestor of the request and other similar information. Access information 304 may include one or more access control checks performed, each including a time, computing resource and/or operation for which the check is performed, access credentials provided, if any, one or more access control policies applicable or applied or identifiers thereof, a result of the access control check (e.g., access granted or denied) and other similar information. In some embodiments, the token may include one or more identifiers that identify some or all of the information illustrated in FIG. 3. Any or all of the information included in the token 300 may or may not be encoded using one or more encoding mechanisms 306 to ensure security and/or authenticity. For example, the information may be encrypted using symmetric or asymmetric encryption or digitally signed with a digital signature. In some embodiments, information included in the token 300 may not be encrypted at all. For example, the token may include an un-identifier represented by a string of alphanumeric characters.

Figure 4:
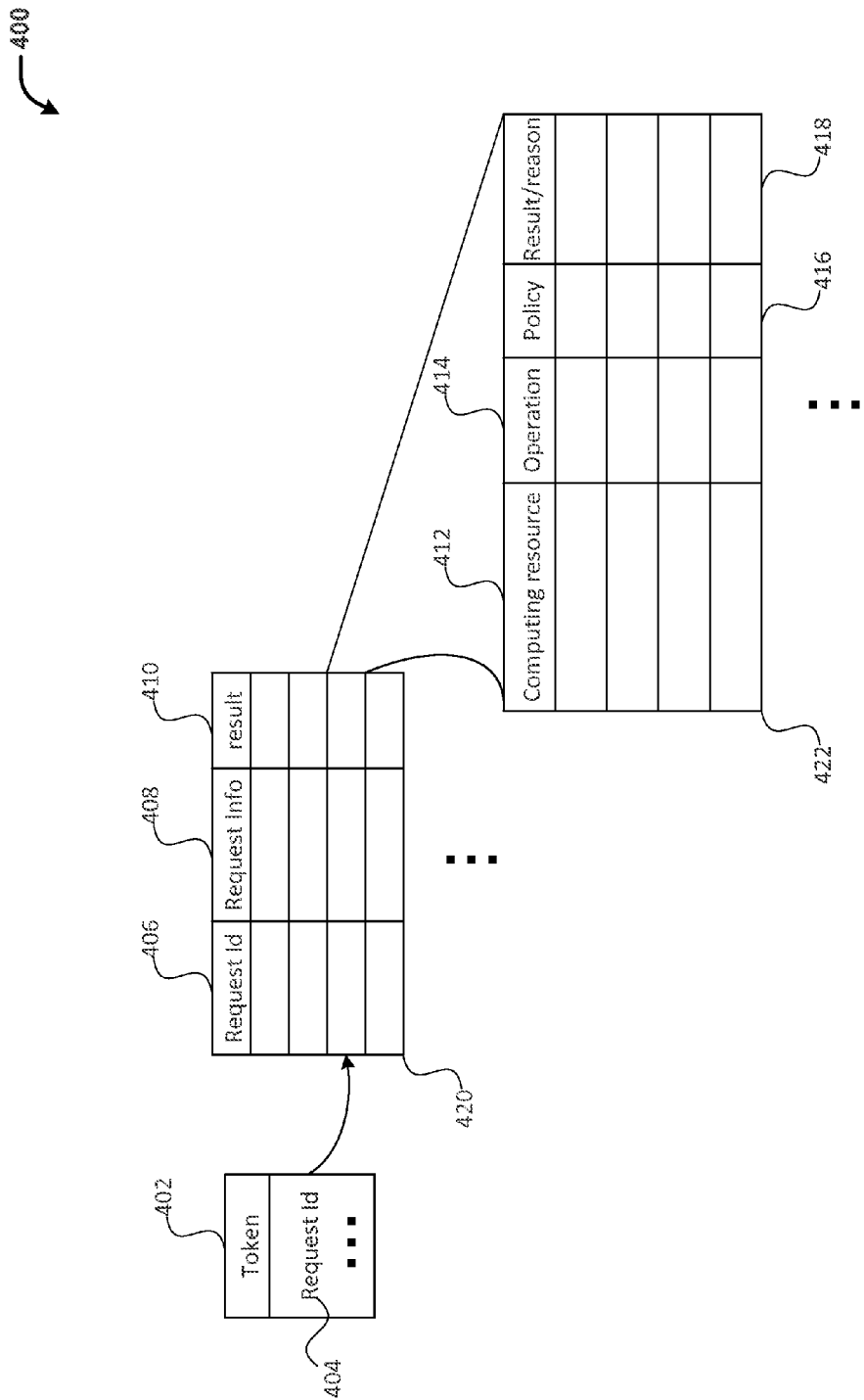
FIG. 4 illustrates an example representation of debugging information for debugging access control policies, in accordance with at least one embodiment.

FIG. 4 illustrates an example representation of debugging information 400 for debugging access control policies, in accordance with at least one embodiment. The token 402 may be similar to the tokens 102 and 300 described in connection with FIGS. 1 and 4, respectively. In the illustrative example, a token 402 may include, among other information, a request Id 404 that identifies a request for which access is denied. The request Id 404 may be used to identify a record in a request log 420, which may contain, among other information, information for each of one or more requests received by a service provider, such as a request Id 406, request information 408 and a result 410 (e.g., "access denied"). In some embodiments, request information 408 may include source IP address of a request, service endpoint, request parameters and the like. Result 410 of a request may include more detailed information 422 on the processing of the request or a reference thereof. The detailed information 422 may include a list of computing resources 412 and/or operations 414 involved in the processing of the request, applied and/or applicable access control policies 416 and results 418 of the access control checks which may include explanation of the results (e.g., "access denied: incorrect password"). The request log 420 and/or more detailed information 422 may be stored in the same or different data store(s). As shown by FIGS. 3 and 4, debugging information may include various context information useful for debugging access control errors and may be encoded in a token and/or stored elsewhere (e.g., in a local or remote data store).

Figure 5:
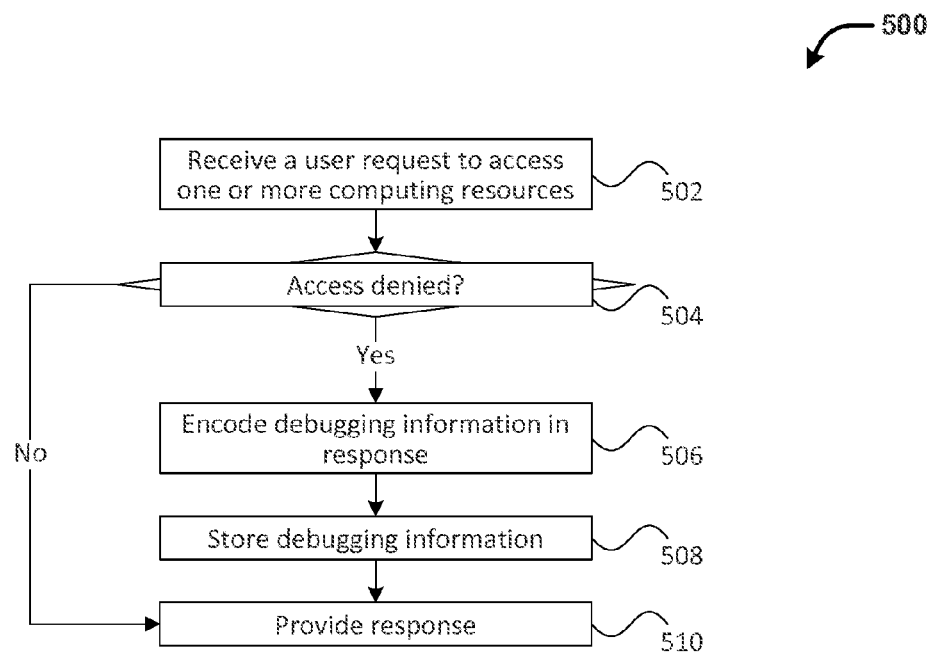
FIG. 5 illustrates an example process for processing user requests, in accordance with at least one embodiment.

FIG. 5 illustrates an example process 500 for processing user requests, in accordance with at least one embodiment. Some or all of the process 500 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations can be combined in any order and/or in parallel to implement the processes. In some embodiments, process 500 may be implemented by one or more components of the service provider 104, such as access control enforcement service 112, as discussed in connection with FIG. 1 or one or more components of a distributed program execution service 200 as shown in FIG. 2.

In some embodiments, process 500 may include receiving 502 a user request to access one or more computing resources. Such a request may involve, for example, provisioning, de-provisioning or managing a virtual computer system instance or storing, deleting and managing data in a virtual data store as described in connection with FIG. 2. For another example, the request may involve accessing and managing a virtual private network. As discussed above, requests may be received via any user interface or API such as web service endpoints.

In some embodiments, process 500 may include determining 504 whether the requested access is denied. Such determination may include determining the requested one or more computing resources to fulfill the request, for example, based on information provided in the request (e.g., service endpoint), and selecting the access control policies applicable to the computing resources. The selected access control policies may be applied to the request to determine whether the access is to be granted. In some embodiments, access may be denied if requested access to any of the requested computing resources is denied. In other embodiments, access may be denied for some computing resources but granted for others. In some embodiments, the decision block 504 may be optional debugging information may always be provided for each request.

If it is determined that requested access is not denied, process 500 may include providing 510 a response that indicates as such. Otherwise, if it is determined that requested access is denied, process 500 may include preparing a response by encoding 506 debugging information as described herein in the response. Such debugging information may be used by a system administrator, for example, to determine the cause of the denial of access. In some embodiments, the debugging information may be encoded in a token similar to the tokens 102, 300, and 402, as described in connection with FIGS. 1, 3 and 4, respectively. In various embodiments, the encoded debugging information may be inaccessible to unauthorized entities such as non-administrative users to provide security. For example, the debugging information may be encrypted using a secret key not accessible to non-administrative users. In another embodiment, the debugging information may be encrypted using a public key, where the corresponding private key is not accessible to non-administrative users. In addition to the debugging information, the response may also provide a user-accessible message that the requested access is denied. In some embodiment, process 500 may also include storing 510 the debugging information, for example, in a file system, a local or remote data store such as data store 114 as described in connection with FIG. 1. In other embodiments, the step 508 may be optional and debugging information may not be stored outside the token or the response. The token may be provided 510 in a response to the user or it may be provided to the user separately from the response. In some embodiments, the response may merely indicate the availability and/or location of the token and/or debugging information without actually transmitting the token to the user. In such embodiments, the user and/or the administrator may obtain the token a subsequent transaction.

Figure 6:
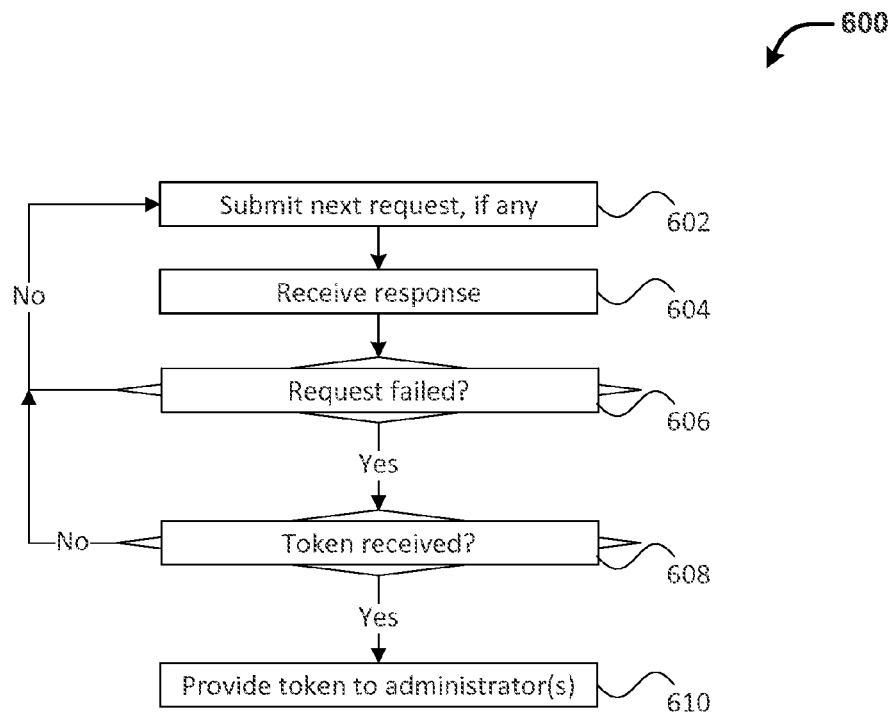
FIG. 6 illustrates an example process for submitting user requests and handling responses, in accordance with at least one embodiment.

FIG. 6 illustrates an example process 600 for submitting user requests and handling responses, in accordance with at least one embodiment. In some embodiments, process 600 may be implemented by one or more computer systems in a user device 102 such as discussed in connection with FIG. 1. In some embodiments, process 600 may start by submitting 602 the next available user request, for example, to a service provider. Such a user request may include a request to access one or more computing resources provided by a service provider, as discussed above. Subsequently, process 600 may include receiving a response that corresponds to the sent request and determining 606 whether the request failed based on the received response. For example, the response may include an error message or error code that indicates that access is denied. For another example, the response may indicate other types of errors such as authentication errors.

If it is determined 606 that the request did not fail, process 600 may include looping back to the beginning block 602 to process the next available request. Otherwise, if it is determined 606 that the request failed, process 608 may include determining 608 whether a token encoding debugging information, as described herein, has been received. Such a token may be sent with the response or separately from the response. If it is determined 608 that such a token has not been received, process 600 may include looping back to starting block 602 of process 600 to submit the next available request, if any. In some embodiments, an error message may be logged or raised. Otherwise, if it is determined 608 that such a token has been received, process 600 may include providing 610 the token to one or more system administrators. In some embodiments, additional information such as user, user-device or request specific information may be provided as well. In some embodiments, such information include the token may be passed to one or more entities (e.g., service or service provider) before reaching the final destiny (e.g., an administrator). Various communication methods such as described in connection with FIG. 1 may be used to provide or pass the token (and optionally other information). As discussed in connection with FIG. 5, in some embodiments, availability and/or location of the token and/or debugging information may be provided instead of the actual token.

Various techniques may be used to transfer information (e.g., a token provided by a service provider) to an administrator. For example, the information may be transferred to the administrator device using a data storage device (e.g., CD, USB drive), an email, a text message, through an API (such as using a web user interface, file transfer protocol (FTP)) or other any communication means and protocols. In some embodiments, tokens and related information related to multiple requests may be provided in a batch and/or on a periodic basis.

Figure 7A:
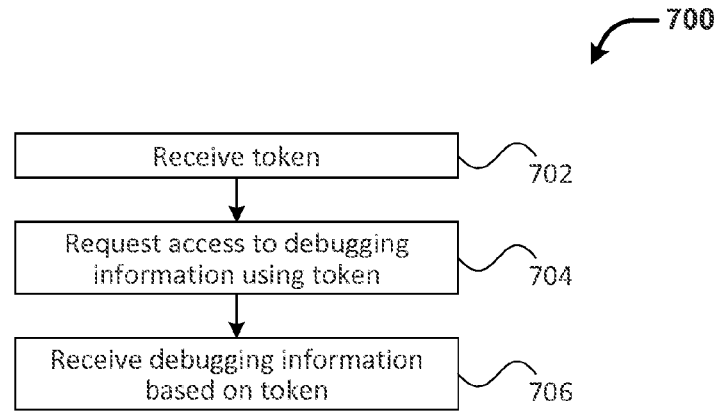
FIG. 7a illustrates an example process for obtaining debugging information, in accordance with at least one embodiment.

FIG. 7a illustrates an example process 700 for obtaining debugging information, in accordance with at least one embodiment. In some embodiments, process 700 may be implemented by one or more computer systems in an administrator device 106 such as discussed in connection with FIG. 1. In some embodiments, process 700 may start by receiving 702 a token that encodes debugging information for a failed request, such as described herein. Such a token may be provided by a user device such as user device 102 as shown in FIG. 1. In some embodiments, the token may be provided by a third-party entity such as a service or service provider, a data store or the like. In some embodiments, information other than the token such as user-device-specific information may be received in addition to the token. In an embodiment, an administrator device may receive an alert or message that such token is available and the administrator device may retrieve the token from a known source such as a known service endpoint, web site, data store and the like.

In some embodiments, process 700 may include requesting 704 access to debugging information using the received token. For example, the request may be sent to the service provider that also provided the token using a user interface or API (e.g., web service endpoint) provided by the service provider. Information about such a user interface or API may be provided by the token, configurable information available a computer system implementing process 700 or the like. In some embodiments, some or all information encoded in the token may be included in the request in the same or a different format. In some embodiments, batch processing techniques may be used to sending multiple tokens in one request.

In some embodiments, process 700 may include receiving 706 debugging information that is based at least in part on the token, for example, from the service provider to which the request to access debugging information is sent. The debugging information may include decoded debugging information included in the token and/or further debugging information obtained using information (e.g., an identifier) included in the token. In some embodiments, process 700 may include making further requests to obtain more debugging information based on received information. The debugging information may be used by an administrator, a computer system, a service or the like for various purposes such as analysis and/or debugging of an access control system, statistical analysis of access data and the like.

Figure 7B:
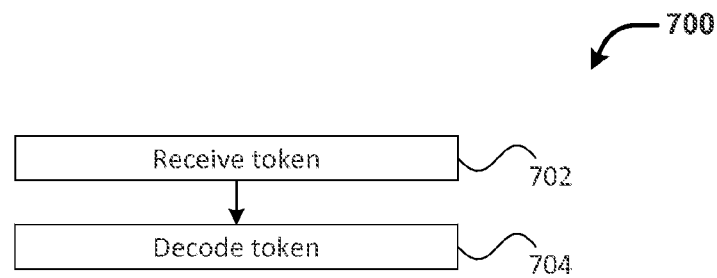
FIG. 7b illustrates an example process for obtaining debugging information, in accordance with at least one embodiment.

FIG. 7b illustrates an example process 700 for obtaining debugging information, in accordance with at least one embodiment. In some embodiments, process 700 may be implemented by one or more computer systems in an administrator device 106 such as discussed in connection with FIG. 1. In some embodiments, process 700 may start by receiving 702 a token such as described in connection with FIG. 7a.

In some embodiments, process 700 may include decoding 704 the token or at least a portion of the token. For example, an administrator may need to decode a token to extract a service endpoint (such as for the access control debugging service 116 shown in FIG. 1). In some embodiments, an administrator device may have access to information required to decode at least a portion of the token. Such information may include cryptographic means (e.g., a cryptographic key) and non-cryptographic means (e.g., code page). The information may or may not be provided by the service provider that also provides the token. In some instances, such information may only be accessible to authorized entities. For example, in an embodiment, a service provider may encrypt the token with a public key associated with an administrator account and the token may be subsequently decrypted (e.g., by an administrator) using a corresponding private key that is only available to the administrator account. In some embodiments, aspects of FIGS. 7a and b may be combined. For example, process 700 may include both decoding the token or a portion thereof and requesting access to debugging information using the token.

Figure 8:
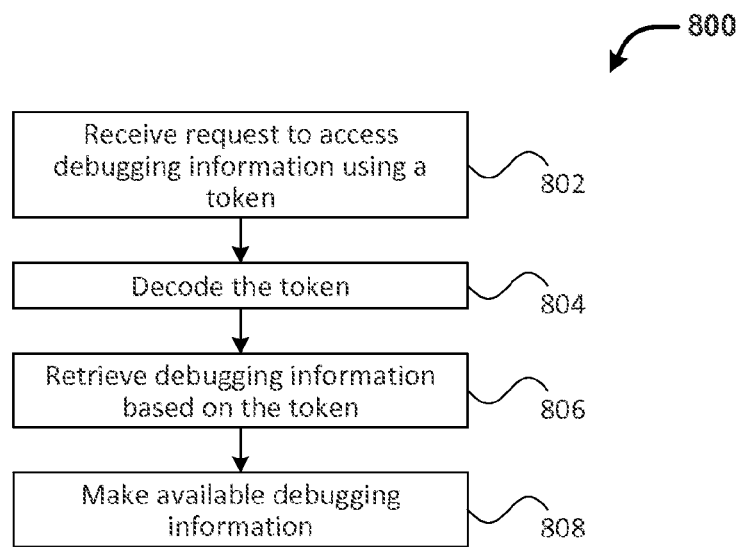
FIG. 8 illustrates an example process for providing debugging information, in accordance with at least one embodiment.

FIG. 8 illustrates an example process 800 for providing debugging information, in accordance with at least one embodiment. In some embodiments, process 800 may be implemented by one or more components of the service provider 104, such as access control debugging service 116, as discussed in connection with FIG. 1 or one or more components of a distributed program execution service 200 as shown in FIG. 2.

In some embodiments, process 800 may include receiving 802 a request to access debugging information. Such a request may be sent by a system administrator and may specify a token encoding at least some of the debugging information described above. The debugging information may be associated with a failed attempt request (e.g., by a user) to access one or more computing resources, as discussed in connection with FIG. 5. In some embodiments, process 800 may also include authenticating and/or authorizing the entity (e.g., administrator) that sent the request to access the debugging information.

In some embodiments, process 800 may include decoding 804 the received token. In some embodiments, decoding 804 the token may include cryptographically decoding the token (e.g., a cryptographic key) or decoding the token using non-cryptographic means (e.g., a character map). In some embodiments, the decoding step 804 may be optional and information included in the token (e.g., an identifier) may be used directly to retrieve debugging information without being decoded first.

In some embodiments, process 800 may include retrieving 806 debugging information based at least in part on the token. In some cases, retrieving debugging information may include extracting information from the token (e.g., after decoding the token or without decoding the token). In other case, information included in the token may be used to look up further debugging information stored elsewhere such as a local or remote data store. Such information stored elsewhere may or may not be encoded (e.g., encrypted). For example, the token may include an identifier (e.g., GUID) or reference to one or more records within a log file or fields within a structured data object that is stored in a data store such as data store 114 shown in FIG. 1.

In some embodiments, process 800 may include making available 808 the debugging information retrieved above. For example, the debugging information may be transmitted to the requesting entity (e.g., administrator device) in a response or made available at a designated location such as a web site. For another example, making available the debugging information may include providing the requesting entity the necessary information or credentials (e.g., password, cryptographic key) to access the debugging information. In some embodiments, batch processing techniques may be applied to various steps of process 800. For example, in an embodiment, multiple requests to accessed debugging information may be processed in a batch.

Variations of aspects of methods and systems described above are also considered as being within the scope of the present disclosure. In particular, the techniques described herein are not limited to debugging access control policies; but may use to allow a system administrator to debug any type of user-experienced errors (e.g., authentication error) in a way that is substantially transparent to the user.

Figure 9:
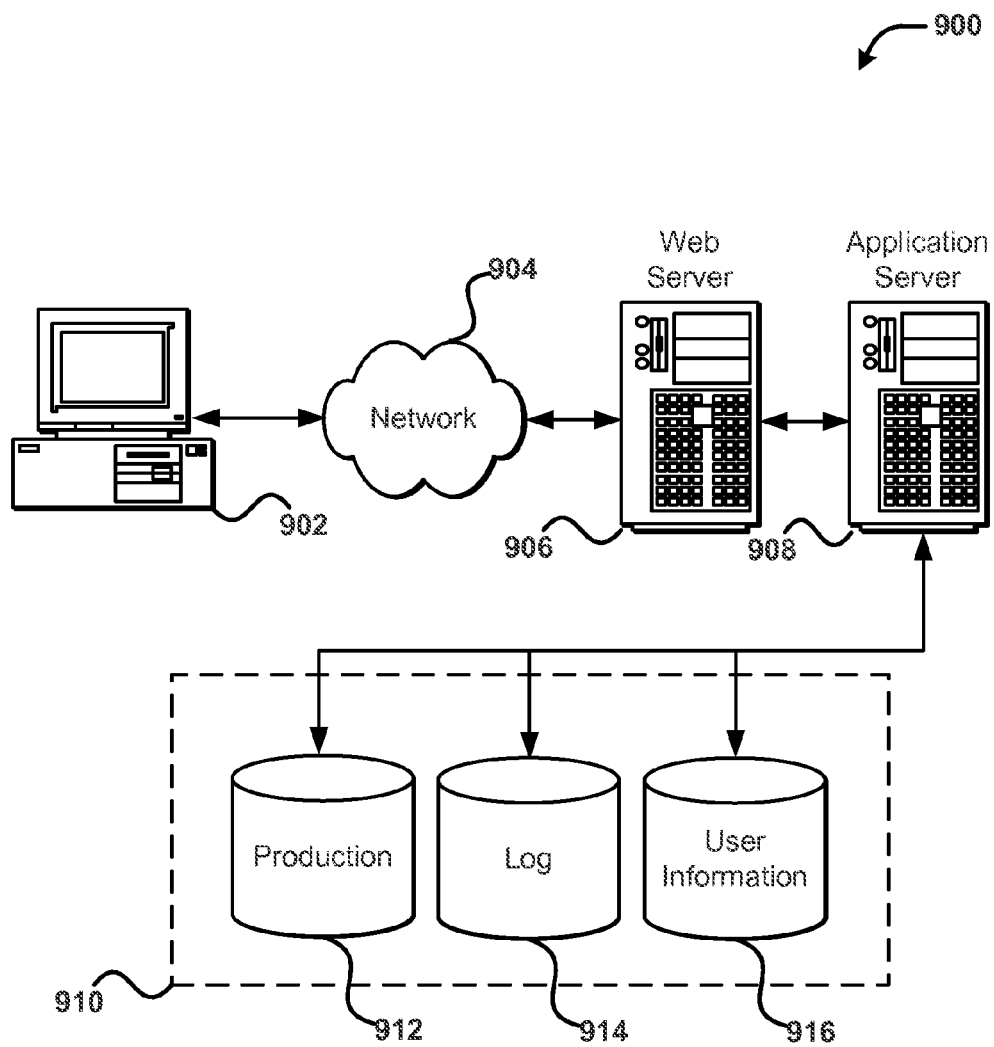
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for debugging access control policies, comprising:
    receiving a first request from a first computing device of a first user to access one or more computing resources;
    determining that the first request is denied according to one or more access control policies;
    after determining that the first request is denied, generating a token that identifies detailed information regarding evaluation of the one or more access control policies and regarding a reason for the determining that the first request is denied;
    providing the token to the first computing device, the detailed information configured to be inaccessible to the first user based at least in part on the token;
    receiving a second request from a second computing device of a second user to access the detailed information, the second request specifying at least the token provided to the first computing device; and
    after receipt of the second request, providing access to at least a portion of the detailed information to the second user, the at least a portion of the detailed information determined based at least in part on the token specified in the second request and information indicating that the token is accessible to the second user.

2. The computer-implemented method of claim 1, wherein the token encodes at least some of the detailed information.

3. The computer-implemented method of claim 1, wherein the detailed information includes one or more values for one or more parameters that characterize the first request to access the one or more computing resources.

4. The computer-implemented method of claim 1, wherein the detailed information includes one or more results associated with one or more access control checks performed for at least some of the one or more computing resources.

5. The computer-implemented method of claim 1, wherein providing the token to the first computing device includes encrypting at least a portion of the detailed information using a cryptographic key to which the first user does not have access and to which the second user has access.

6. The computer-implemented method of claim 1, wherein providing access to at least a portion of the detailed information to the second user includes decrypting at least the portion of the token using a cryptographic key to which the first user does not have access.

7. A computer-implemented method for managing access to computing resources, comprising:
    denying access to one or more computing resources to a first identity based at least in part on an attempt of the first identity to access the one or more computing resources;
    based at least in part on denying the access to the one or more computing resources, generating a token encoding at least in part information associated with a reason for the denied access to the one or more computing resources;
    providing the token to the first identity, the token being unusable by the first identity to decode and access the information; and
    after receiving a request from a second identity to access the information and comprising an identification of the token, making available the information to the second identity based at least in part on the token.

8. The computer-implemented method of claim 7, wherein the information includes debugging information usable for debugging one or more access control policies related to the denied access.

9. The computer-implemented method of claim 7, further comprising providing an application programming interface ("API") for receiving the token and for making available the information based at least in part on the token.

10. The computer-implemented method of claim 7, wherein making available the information includes decoding the token to obtain decoded information and providing the decoded information.

11. The computer-implemented method of claim 7, wherein making available the information includes extracting information from the token and obtaining further information based at least in part on the extracted information.

12. The computer-implemented method of claim 7, wherein the one or more computing resources include a virtual data store or a virtual computer system.

13. The computer-implemented method of claim 7, wherein the token encodes at least an error code associated with the denied access.

14. A computer system for managing access to computing resources, comprising:
    one or more processors; and
    memory, including instructions executable by the one or more processors to cause the computer system to at least:
        receive a request from a computing device of a user to access one or more computing resources;
        deny the request to access the one or more computing resources;
        based at least in part on denying the request, generate a token that encodes at least partially debugging information useful for determining a reason for the denial of the request;
        provide the token to the computing device of the user, at least a portion of the debugging information is inaccessible to the user based at least in part on the token;
        receive a second request from a computing device of a second user to access the debugging information, the request specifying at least the token; and
        in response to the second request, provide access to the debugging information to the second user based at least in part on the token.

15. The computer system of claim 14, wherein providing access to the debugging information to the second user includes decoding the token.

16. The computer system of claim 14, wherein the token encodes at least an identifier useful for identifying information related to the request to access the one or more computing resources.

17. The computer system of claim 14, wherein the debugging information includes at least a time and a source network address associated with the request to access the one or more computing resources.

18. The computer system of claim 14, wherein the request to access one or more computing resources is denied according to one or more access control policies applicable to the one or more computing resources.

19. One or more non-transitory computer-readable storage media having stored thereon executable instructions that, when executed by one or more processors of a computer system, cause the computer system to at least:
receive a request from a privileged identity to access debugging information associated with accessing a resource, the request specifying a token provided to a less privileged identity, the token having been generated and provided to the less privileged identity based at least in part on receiving a request from the less privileged identity to access the resource and based at least in part on determining that the resource is inaccessible to the less privileged identity, the debugging information being inaccessible to the less privileged identity based at least in part on the token; and
in response to the request, providing access to the debugging information to the privileged identity based at least in part on the token provided to the less privileged identity.

20. The one or more computer-readable storage media of claim 19, wherein instructions further cause the computer system to:
receive the request from the less privileged identity to access one or more computing resources; and
subsequent to determining that the request to access one or more computing resources is denied, provide the less privileged identity with the token that encodes at least in part the debugging information such that the encoded debugging information is inaccessible to the less privileged identity.

21. The one or more computer-readable storage media of claim 20, wherein the debugging information is useful for determining a reason for the denial of the request by the less privileged identity to access the one or more computing resources.

22. The one or more computer-readable storage media of claim 19, wherein the privileged identity is configured to request access to the debugging information in response to receiving the token from the less privileged identity.

23. The one or more computer-readable storage media of claim 19, wherein the executable instructions further cause the computer system to verify that the privileged identity is authorized to access the debugging information.

24. The one or more computer-readable storage media of claim 19, wherein the executable instructions further cause the computer system to provide an interface for the privileged identity to submit the token and to receive the debugging information based at least in part on the token.

25. The computer-implemented method of claim 1, further comprising providing an interface accessible to the second user for defining a format and a level of the detailed information, wherein the token encodes the information usable for obtaining the detailed information based at least in part on the defined format and level of the detailed information.

26. The computer-implemented method of claim 1, wherein providing the token to the first computing device causes the first computing device to provide the token to the second computing device and the second computing device to submit the second request after receiving the token from the first computing device.

* * * * *